May 24, 1960
T. B. GIBBS
2,938,100
TIRE RETREADING
Filed June 14, 1957
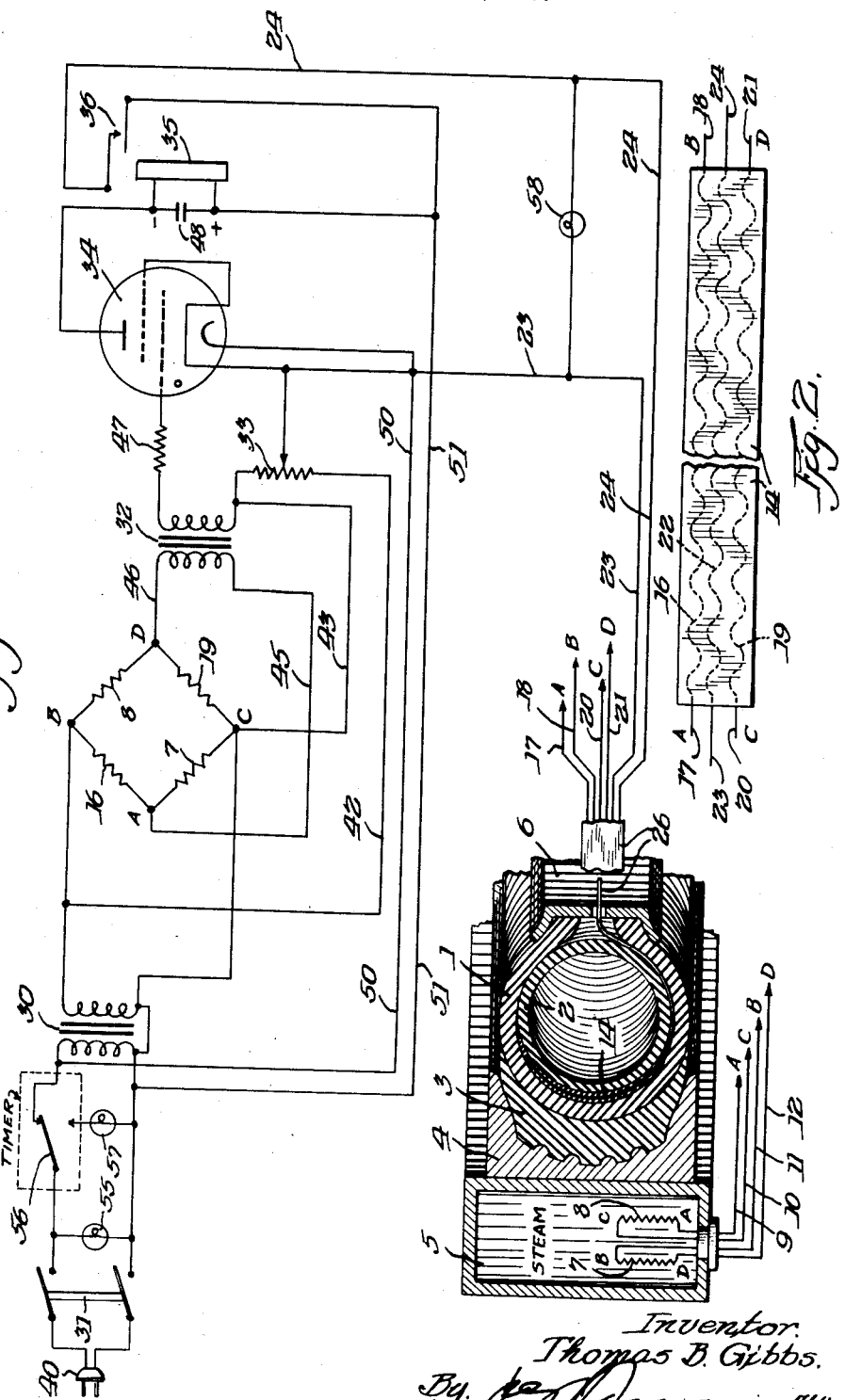

United States Patent Office 2,938,100
Patented May 24, 1960

2,938,100
TIRE RETREADING

Thomas B. Gibbs, Delavan, Wis., assignor, by mesne assignments, to The Goodyear Tire & Rubber Company, a corporation of Ohio Filed June 14, 1957, Ser. No. 665,795
18 Claims. (Cl. 219—20)

This invention relates to the art of vulcanizing and is particularly concerned with a system for retreading tires.

Conventional retreading as heretofore practiced involved the following steps, namely, first, stripping a tire of remnants of the worn out tread, smoothing and cleaning it so as to prepare it for retreading; second, putting upon the casing thus prepared a band of new rubber, the so-called camelback, which is to form the new tread; third, inserting into the tire a special tube, the so-called curing tube; fourth, placing the resulting assembly consisting of the casing surrounded by the camelback and containing the curing tube, into a curing mold comprising a tread-forming matrix surrounding the camelback and means for heating the matrix, for example, a steam jacket or jackets surrounding the matrix; fifth, inflating the curing tube to produce pressure acting radially outwardly so as to press the camelback firmly against the heated tread-forming matrix. The heat thus applied, on the order of about 292° F. to 300° F., effects vulcanization of the band of new rubber, resulting due to the pressure which is simultaneously effective, in the molding of the retread into its finished form and uniting all parts together.

The prior procedure briefly described above depends upon heat transfer radially inwardly from the heated matrix through the band of new rubber to the interface or bonding area between the new rubber and the casing. The heat transfer conditions are thus inherently poor and consequently produce several drawbacks, among others, non-uniform curing, danger of overcuring the retread in part, and long curing times, on the order of several hours, resulting in poor economy.

Attempts to improve the situation include the proposal, disclosed in copending application, Serial No. 584,570, filed May 14, 1956, to provide a beltlike electric heating element assembled with the curing tube and placed inside the tire casing to be retreaded, for heating the casing from the inside, thereby transferring heat radially outwardly to the interface or bonding area while heat is at the same time transferred thereto radially inwardly through the band of new rubber which is in pressure engagement with the steam-heated tread-forming mold matrix.

The thought underlying the improvement according to the above noted copending application is to produce optimum curing temperature inside as well as outside of the interface or bonding area, with the object of producing uniform curing throughout while at the same time shortening the curing time. In order to realize this object, there is provided a cam-controlled timing device for intermittently applying current, in predetermined empirically determined time intervals, to the heating element inside the tire casing.

This prior procedure suffers from shortcomings which are inherent in the cam-controlled timing device. It is obviously necessary to determine the timing intervals required for each type of tire that may have to be retreaded and to develop separate cams respectively corresponding thereto. This is a time-consuming and expensive procedure resulting in a stock of cams each empirically developed according to a prototype case of retreading. However, retreading jobs might present conditions that may vary, however slightly, from those of the prototype and it will consequently be difficult to provide the most ideal heating for each case of retreading; adjustments will be required which will depend on the skill and experience of the operator.

The primary object of the present invention is to provide an automatically operating electronic control for the regulation of the current supply to the heating element disposed inside a tire casing which is being retreaded.

The new electronic control comprises, as principal components, sensing resistor means for deriving electrical criteria from the heat sources operating respectively from the inside and from the outside of a casing being retreaded, indicative of the temperature conditions produced at the corresponding areas, and a device for evaluating these criteria. The evaluating device comprises a resistance bridge similar to a Wheatstone bridge, containing said sensing resistor means, a thyratron tube controlled jointly by said bridge and by a potentiometer, and means, for example, relay means controlled by the thyratron, for connecting current to the heating element inside of the tire casing only at times and for intervals of unbalance of the bridge. The potentiometer may be set to effect controlled switching of the thyratron from cutoff to pass condition so as to control the temperature produced inside the tire casing as may be desired. A timing device is provided to stop the actuation of the electronic control upon completion of the vulcanizing and curing operation.

The control system according to the invention makes it possible to maintain at all times during the curing operation, with simple and reliably operating means, a desired curing temperature inside of the tire casing, for example a temperature corresponding substantially to the curing temperature applied circumferentially to the band of new rubber which is to form the retread. The system operates automatically and, broadly speaking, independent of the particular type of tire that may be processed for retreading.

The various objects and features of the invention will appear from the description of an embodiment which will be rendered below with reference to the accompanying drawing.

Fig. 1 shows in schematic manner the relative position of parts during the retreading of a tire and the electronic control system; and Fig. 2 shows in schematic developed view an example of the heating element disposed inside of a tire during the retreading thereof.

Referring now to the drawing, numeral 1 indicates a tire casing; 2 the curing tube; 3 the band of new rubber commonly referred to as camelback; 4 the tread-forming matrix; 5 a steam jacket surrounding the matrix 4; and 6 is the inner rim of the molding machine which holds the parts in place. The retread 3 is for convenience shown in finished condition with the tread formed thereon. A steam jacket 5, which is part of the molding machine, has been shown for convenience only; it is clear that the matrix 4 may be heated by another medium, for example, electrically.

Temperature sensing resistors 7 and 8 are provided to derive an electrical criterion from the heating medium within the jacket or chamber 5. A single sensing resistor may be used, if desired; two such resistors are being used to provide for increased sensitivity. These resistors have been shown inside of the steam chamber formed by the jacket 5 for convenience of representation; they may be disposed differently in any desired and suitable manner, for example, within a tubular holder forming part of or extending from the steam inlet (not shown). In the case of an electrically heated mold, these sensing or control resistors 7 and 8 may be disposed at a suitable and desired point, relative to the corresponding heating means and the mold parts heated thereby, at which the optimum heat is transferred. Numerals 9 and 10 indicate the terminals for the resistor 8 and numerals 11 and 12 indicate the terminals for resistor 7. The manner in which these terminals are connected to the control system will be presently described.

Between the curing tube 2 and the inside of the tire casing 1 is disposed the heating element 14. This heating element may be in the form of a beltlike circular member diagrammatically indicated in developed view in Fig. 2, containing wires for heating and for temperature sensing or control purposes, respectively. Three wires 16, 19 and 22 are shown in Fig. 2, embedded in undulating fashion within the element 14 which is composed of two rubber sheets. Wires 16 and 19 form temperature sensing or control resistors, and wire 22 is the heating wire. Two temperature sensing resistors are again employed for increased sensitivity; one may be provided if desired. Numerals 17 and 18 indicate the terminals extending from the sensing resistor 16; numerals 20 and 21 the terminals extending from the sensing resistor 19; and numerals 23 and 24 indicate the terminals extending from the heating wire 22.

These terminal wires are carried to the outside by means of a cable 26 extending from the heating element 14 through an opening formed in the inner mold rim 6. The cable is shown in two identically marked broken-away portions 26, the right hand portion on a larger scale, to provide room for showing the terminals.

The heating element 14 may be constructed in accordance with the disclosure contained in copending application Serial No. 640,387, filed February 15, 1957. For simplification, only one heating wire 22 having the terminals 23 and 24 has been shown in Fig. 2. The heating wire may, however, comprise any desired or required number of turns as disclosed in the last noted copending application. The wires 16 and 19, constituting the temperature sensing resistors, may be part of the heating element 14, as shown, or may be disposed differently, in any suitable and desired manner, provided that the disposition thereof meets the requirement according to which such resistors are to be placed at a point of heat transfer from the heating element 14 to the inside of the casing which is being retreaded.

The resistors 7 and 8 for sensing the temperature of the steam and also the resistors 16 and 19 for sensing the temperature developed by the heating element 14, as well as the heating wire 22 are all made of a material that changes its electrical resistance responsive to temperature changes. For example, these elements may be made of Balco wire which is an alloy substantially of 70% nickel and 30% iron and responds to temperature increase by increasing resistance. The corresponding thermally dependent characteristic is in case of the temperature sensing resistors 7 and 8 and 16, 19 important because the change in electrical resistance responsive to temperature changes furnishes the electrical criteria to be derived from the heat developed by the heating media operating respectively outside and inside of the tire casing that is being retreaded. The thermally dependent characteristic of the wire material is, however, also important—but for entirely different reasons—in case of the heating wire or wires 22 embedded within the body of the heating element 14. As pointed out in the above noted copending application Serial No. 640,387, the use of a heating wire with thermally dependent resistance characteristic—resistance increases with increase in temperature—makes it possible to heat the heating wire or wires initially to relatively high temperature without disintegrating the surrounding rubber of the heating element, thus providing for quick and efficient heat transfer. The heating wire or wires 22, having such thermally dependent resistance characteristic, accordingly operates with a safety feature that avoids overheating automatically.

The sensing resistor wires 16 and 19 and the heating wire or wires 22 are, as disclosed in the copending application last referred to, insulated with glass braid and disposed in undulating fashion to provide for flexibility, thereby guarding the wires against damage. The glass braid insulation contributes to the flexibility and, in the case of the heating wire 22, provides for favorable heat transfer.

The control system and evaluating device, shown in the upper part of Fig. 1, comprises a step-down transformer 30, for example, for delivering 20 v. at the secondary winding, transformed from 110 v. of a commercial current source connected by way of a switch 31 in actuated position thereof; a bridge formed by the temperature sensing or control resistors 7 and 8 and 16 and 19, respectively, which furnish the electrical criteria derived respectively from the heat developed by the sources 5 and 14; a coupling transformer 32 for increasing the voltage of the signals derived from the bridge, thus operating in the nature of an amplifier; a potentiometer 33 for setting the desired temperature for the electric heating element 14; a thyratron 34 for receiving the signal voltages from the bridge; and a relay 35 which controls a contact 36. Numeral 55 is a pilot light for indicating the "on" condition of the system; 56 is a contact controlled by a suitable timer set for a predetermined interval to disconnect current from the system upon completion of a retreading operation; and 58 is a lamp for indicating the operative actuation of the heating element 14.

The pairs of terminals 9, 10—11, 12—17, 18—20, 21—23, 24 of the temperature sensing resistors and of the heating wire 22, respectively—are removably connected with the circuit of the control system, which may be suitably enclosed in a control box, for example, by suitable plug and socket means (not shown). After assembling the parts as indicated at the left hand bottom of Fig. 1, these terminals are connected with the circuit of the control or evaluating system over the corresponding plug and socket means. The terminals respectively extending from the control resistors 7, 8 (mold heating source) and sensing resistors 16, 19 (inside tire heating source) and from the heating wire 22, will then be interconnected with the circuit as shown. In order to simplify the drawing, the terminals extending respectively from the control resistors 7, 8 and 16, 19 are marked A, B, C, D, indicating the points at which these resistors will be placed to form the evaluating bridge shown.

Assuming the parts to be assembled and to be interconnected as shown in Fig. 1; further assuming for convenience that all parts are at room temperature; also that the plug 40 has been connected with an alternating current source, for example 110 v. 60 cycles, and the switch 31 placed in actuated position, the operations will be as follows:

The commercial current will be connected by way of the timer contact 56 and will be transformed by the step-down transformer 30 to supply to the system current with a desired voltage, for example, 20 v. The pilot light 55 is on current and indicates that the system is in operation. All parts, including the sensing resistors 7, 8 (outer mold heating source) and 16, 19 (inner tire heating source) are assumed to be at identical temperature, and the bridge formed by these sensing or control resistors will accordingly be balanced. The potentiometer 33 is on 20 v. current from the secondary winding of the step-down transformer 30 over conductors 42, 43. As has been said before, the purpose of the potentiometer is to set the desired temperature for the heating element 14. This is done by supplying adjustable variable grid bias for the thyratron to effect operation thereof as desired, in accordance with the requirements of tires being recapped. Since there is a time element involved, the potentiometer 33 may also be considered as a timing device for controlling the intermittent supply of current to the heating element 14. Points B and C of the sensing bridge are on 20 v. from the secondary winding of the transformer 30. Points A and D of the bridge are connected with the primary of the coupling transformer or amplifier 32 over conductors 45, 46. The secondary winding of this latter transformer is connected with the control grids of the thyratron by way of a resistor 47 and the potentiometer 33, and one terminal thereof is connected with a terminal of the commercial current source over conductor 43. The bridge being balanced, the thyratron will be at cutoff. Relay 35 will be at normal, keeping contact 36 open and current from the commercial current source accordingly disconnected from the heating wire 22 of the heating element 14. It will be appreciated that a relay (35) has been shown for convenience of representation; a suitable tube, for example, a thyratron may be used as a switching means for this purpose.

Steam now injected into the heating chamber or chambers of the mold jacket or jackets 5 will heat the sensing resistors 7 and 8, thus changing the resistance thereof, in the case of Balco wire or the like, increasing the resistance thereof, and therefore unbalancing the evaluating bridge. The thyratron grids will now receive current of a magnitude governed by the signal voltage from the sensing bridge as controlled by the setting of the potentiometer 33 and, assuming proper bias voltage on the grids, will pass current to effect actuation of relay 35. The latter closes its contact 36, thereby closing a circuit extending by way of conductors 23, 24, 50, 51 to the commercial current source and including the heating wire 22. Electrically generated heat will thus be developed inside the tire casing for transfer radially outwardly in the direction of the interface or bonding area, while steam-generated heat is transferred to such interface radially inwardly from the mold matrix 4 through the band of new rubber 3. The potentiometer may be set to effect operative actuation of the thyratron responsive to the slightest temperature differential sensed by the bridge or with a delay requiring a differential of greater magnitude. It is accordingly possible to operate the heating element 14 at a desired temperature, even at a temperature exceeding that of the steam.

The unbalance condition of the bridge will continue for an interval until the sensing resistors 16 and 19 are at the desired temperature, for example, at the same temperature as the steam heated sensing resistors 7 and 8. Heat of identical temperature, on the order of about 296° F., is accordingly applied at both sides of the interface or bonding area. The bridge is now again at balance condition and the thyratron 34 will cut-off again and relay 35 will restore to normal with a slight delay due to the action of a capacitor 48 connected in parallel with the winding thereof. Upon restoring, relay 35 disconnects current from the heating wire 22 of the heating element 14.

The injection of steam continues, thereby continuing heat transfer to the matrix 4 and through the band of new rubber, radially inwardly in the direction of the interface or bonding area until a temperature differential results due to a slight drop of temperature in the heating element 14 when the bridge is unbalanced again to cause firing of the thyratron and consequent energization of relay 35 to reconnect current to the heating element 14.

This interplay continues, causing generation of heat, within the tire casing at and from an interval after injecting steam and thereafter periodically, to produce within the tire casing a desired radially outwardly effective temperature, for example, a temperature corresponding to the radially inwardly effective temperature produced outside of the new band of rubber by the steam heating. The signal lamp 58 will be on current whenever current is supplied to the heating wire or wires 22 of the heating element 14 so as to indicate the actuation thereof.

The timer is set to actuate contact 56 upon termination of a predetermined time interval required for completion of the vulcanization and cure of a retread. This interval may be different for different types of tires and is determined by measurements. Contact 56 disconnects current from the control system and closes a circuit for lamp 57 which signals completion of the operation.

The invention reduces to approximately one-half and more the amount of time necessary to cure a tire by conventional methods. The quality of the cure is considerably improved which is attributed to the fact that the tire is held in the 300° F. temperature range for a much shorter time than under present conventional methods. Repair of casings and retreading can be effected in one operation; heat applied according to the invention from the inside of a casing assures proper vulcanization of a patch as well as retreading in one operation. The invention will permit small shops to render a service heretofore impossible, namely, making it feasible, to retread tires for customers within short times, for example, while a customer attends to other errands such as shopping. Another important advantage resides in the fact that at least twice the retreading can be accomplished in the same floor space and with the same equipment now being used. The expenditures for energy amount only to fractions of the amounts required in the case of conventional methods. There are other advantages, for example, pertaining to operation, which will be recognized by those experienced in the art.

The invention has been developed specifically for retreading tires. However, some or all of the features disclosed herein may be useful in other fields related to vulcanizing.

Changes may be made within the scope and spirit of the appended claims.

I claim:
1. In a system for vulcanizing a rubber body to a carrier therefor, comprising first and second heating means for respectively imparting to said body heat from the side thereof which faces away from said carrier and to said carrier from the side thereof which faces away from said body, a device for controlling the application of heat from one of said heating means in relation to the temperature of the other of said heating means, said device comprising sensing means disposed relative to said first and second heating means and adapted to sense the temperature of the heat applied thereby, an evaluating circuit adapted to develop a signal indicative of the relationship of the temperatures sensed by said sensing means, means for connecting said sensing means to said evaluating circuit, and control means responsive to the signal developed by said evaluating circuit for controlling the supply of heat-generating energy to said one heating means.

2. A system and cooperation of parts according to claim 1, wherein said body is a band of rubber carried by a pneumatic tire casing to form after vulcanizing a tread thereon, said tire casing constituting said carrier.

3. A system and cooperation of parts according to claim 2, comprising a discharge tube included in said evaluating circuit, switching means controlled by said tube, and means governed by said switching means for controlling the supply of heat-generating energy to said one heating means.

4. A system and cooperation of parts according to claim 3, wherein said sensing means includes a temperature sensitive resistor means.

5. A system and cooperation of parts according to claim 3, comprising means for controlling the operative actuation of said tube to govern the supply of heat-generating energy to said heating means to effect heating thereof to a predetermined temperature.

6. In a system for vulcanizing a band of rubber to a tire casing comprising first and second heating means for respectively imparting to said band heat from the side thereof which faces away from said casing and to said casing from the side thereof which faces away from said band, a device for controlling the application of heat from one of said heating means, said device comprising resistor means disposed relative to at least one of said heating means and adapted to sense the temperature of the heat applied thereby, an evaluating circuit including a bridge having said resistor means as a part thereof and a discharge tube in said circuit, timing means controlling the operative actuation of said tube, switching means controlled by said tube, and means governed by said switching means for controlling the supply of heat-generating energy to said one heating means.

7. In a system for vulcanizing a band of rubber to a tire casing comprising first and second heating means for respectively imparting to said band heat from the side thereof which faces away from said casing and to said casing from the side thereof which faces away from said band, a device for controlling the application of heat from one of said heating means, said device comprising resistor means disposed relative to at least one of said heating means and adapted to sense the temperature of the heat applied thereby, an evaluating circuit having said resistor means as a part thereof and a discharge tube in said circuit, means for controlling the operative actuation of said tube to govern the supply of heat-generating energy to said heating means to effect heating thereof to a predetermined temperature, switching means controlled by said tube, means governed by said switching means for controlling the supply of heat and generating energy to said one heating means, and timing means for disconnecting current from said evaluating circuit upon termination of a predetermined time interval.

8. In a system for vulcanizing a band of rubber to a tire casing comprising first and second heating means for respectively imparting to said band heat from the side thereof which faces away from said casing and to said casing from the side thereof which faces away from said band, a device for controlling the application of heat from one of said heating means comprising two resistor means each forming sensing means for cooperation, respectively, with said first and second heating means to sense the temperature of the heat applied thereby, an evaluating circuit having a discharge tube therein and including a bridge having arms formed by said resistor means, said sensing resistor means producing a balance in said bridge in the presence of substantially identical temperatures of the heat applied by said heating means and a condition of unbalance responsive to sensing a temperature differential, said unbalance condition being effective to cause operative actuation of said tube, switching means controlled by said tube, and means governed by said switching means for controlling the supply of heat-generating energy to said one heating means.

9. A system and cooperation of parts according to claim 8, comprising respectively steam-controlled and electrically controlled heating means, the operation of said electrically controlled heating means being governed by said switching means.

10. A system and cooperation of parts according to claim 9, comprising electrically controlled heating means including temperature-sensing resistor means as a structural part thereof.

11. A system and cooperation of parts according to claim 8, comprising a current source, means for connecting said current source to said circuit, and a transformer for supplying to said circuit current at a voltage different from that of said current source.

12. A system and cooperation of parts according to claim 8, comprising means for removably connecting said sensing resistor means and said electrically controlled heating means with said evaluating circuit.

13. A system and cooperation of parts according to claim 8, comprising an electronic tube for utilizing signal voltage supplied by said bridge, and amplifier means for amplifying said signal voltage.

14. A system and cooperation of parts according to claim 8, comprising signal means for respectively signalling operation of the system and actuation of said switching means and completion of the vulcanizing operation.

15. A temperature control system for use with a tire vulcanizing mold, said mold having first means to apply heat to the outer periphery of a tire contained therein and second means disposed adjacent the inner tread surface of said tire for supplying heat thereto, said control system comprising in combination first and second temperature responsive resistance elements associated with said first and second heating means respectively for deriving therefrom electrical criteria proportional to the temperatures thereof, a bridge circuit including said resistance elements and adapted to compare said criteria and produce an electrical signal representative of the temperature differential between said first and second heating means, amplifying means coupled to said bridge circuit and adapted to amplify said electrical signal and present it as an output of said bridge circuit, control means coupled to said amplifying means and operable by the amplified signal therefrom, said control means including a gas discharge tube having at least a cathode, anode and a control grid, timing means coupled to said control means to regulate the point of operation thereof by said amplified signal, said timing means including an adjustable voltage supply means coupled to a control grid of said gas discharge device and adapted to impress a bias voltage thereon, and means operated by said control means to cause heat producing energy to be supplied to said second heating means when an appropriate signal appears across said bridge.

16. A temperature control system as claimed in claim 15 in which said amplifying means is a transformer.

17. A temperature control system as claimed in claim 15 in which said means operated by said control means is a relay.

18. A temperature control system for use with a tire vulcanizing mold, said mold having first means to apply heat to the outer periphery of a tire contained therein and second electrical means disposed adjacent the inner tread surface of said tire for supplying heat thereto, said control system comprising in combination first and second temperature responsive resistance elements associated with said first and second heating means respectively for deriving therefrom electrical criteria proportional to the temperature thereof, a bridge circuit including said resistance elements and adapted to compare said criteria and produce an electrical signal representative of temperature differential between said first and second heating means, transformer means coupled to said bridge circuit and adapted to amplify said electrical signal and present it as an output of said bridge circuit, control means coupled to said transformer means and operable by the amplified signal therefrom, said control means including a gas discharge tube having at least a cathode, anode and a control grid, timing means coupled to said control means to regulate the point of operation thereof by said amplified electrical signal, said timing means including an adjustable voltage supply means coupled to a control grid of said gas discharge means and adapted to impress a bias voltage thereon, and relay means operated by said control means to cause heat producing electrical energy to be supplied to said electrical heating means when an appropriate signal appears across said bridge.

References Cited in the file of this patent

UNITED STATES PATENTS

| | | |
|---|---|---|
| 1,162,397 | Price | Nov. 30, 1915 |
| 1,694,264 | Hull | Dec. 4, 1928 |
| 2,014,332 | Houlette | Sept. 10, 1935 |
| 2,164,312 | Drake | July 4, 1939 |
| 2,499,760 | Kimball | Mar. 7, 1950 |
| 2,522,753 | Drobisch | Sept. 19, 1950 |
| 2,673,917 | Woodling | Mar. 30, 1954 |
| 2,797,438 | Robb | July 2, 1957 |
| 2,838,643 | Elliot et al. | June 10, 1958 |